United States Patent
Bacon

[19]

[11] Patent Number: 5,918,461
[45] Date of Patent: Jul. 6, 1999

[54] STATOR ASSEMBLY HAVING SINGLE DIRECTION ANTI-ROTATION DEVICE

[75] Inventor: Duane Allen Bacon, Saline, Mich.

[73] Assignee: Mannesmann Sachs AG, Germany

[21] Appl. No.: 08/892,078

[22] Filed: Jul. 14, 1997

[51] Int. Cl.⁶ .................................................. F16D 33/00
[52] U.S. Cl. ............................................... 60/343; 60/345
[58] Field of Search ........................... 60/341, 343, 344, 60/345

[56] References Cited

U.S. PATENT DOCUMENTS

| | | | |
|---|---|---|---|
| 2,588,668 | 3/1952 | Syrovy . | |
| 2,611,452 | 9/1952 | Lapsley . | |
| 3,263,522 | 8/1966 | General . | |
| 3,274,854 | 9/1966 | Kelley et al. . | |
| 3,300,971 | 1/1967 | Qualman et al. . | |
| 3,461,670 | 8/1969 | Waclawek | 60/343 |
| 3,507,118 | 4/1970 | Yamaguchi et al. | 60/345 |
| 3,724,208 | 4/1973 | Welch et al. | 60/343 |
| 4,441,315 | 4/1984 | Bochot . | |
| 5,125,487 | 6/1992 | Hodge . | |
| 5,241,820 | 9/1993 | Fukunaga et al. . | |
| 5,718,114 | 2/1998 | Murata et al. | 60/343 |

*Primary Examiner*—John E. Ryznic
*Attorney, Agent, or Firm*—Bliss McGlynn, P.C.

[57] ABSTRACT

A stator assembly for use in a torque converter wherein the stator assembly includes a grounded member, a reaction member and a blade assembly operatively coupled with the reaction member for rotational movement about an axis of rotation relative to the grounded member in one direction and fixed against rotational movement relative to the grounded member in the opposite direction. The reaction member is movable axially relative to the grounded member in response to fluid forces acting on the blade assembly between a first position wherein the reaction member and the blade assembly are free to rotate in one direction and a second, locked position wherein the reaction member and the blade assembly are fixed relative to the grounded member and against rotation in the opposite direction.

14 Claims, 4 Drawing Sheets

STATOR ASSEMBLY HAVING SINGLE DIRECTION ANTI-ROTATION DEVICE

BACKGROUND OF THE INVENTION

1. Field of the Invention

The present invention relates, generally, to a stator assembly and, more specifically, to a torque converter including a stator assembly having a single direction anti-rotation device.

2. Description of the Related Art

In automotive applications, engine torque and speed are translated between a prime mover, such as an internal combustion engine, to one or more wheels through the transmission in accordance with the tractive power demand of the vehicle. Hydrokinetic devices, such as torque converters, are often employed between the internal combustion engine and its associated transmission for transferring kinetic energy therebetween.

Torque converters of the type generally known in the related art include impeller assemblies operatively connected for rotation with the torque input from the internal combustion engine, a turbine assembly fluidly connected in driven relationship with the impeller assembly and a stator assembly. These assemblies together form a substantially toroidal flow passage for kinetic fluid in the torque converter. Each assembly includes a plurality of blades or vanes which act to convert mechanical energy to hydrokinetic energy and back to mechanical energy. The stator assembly of conventional torque converters are locked against rotation in one direction but are free to spin about an axis in the direction of rotation of the impeller assembly and turbine assembly. When the stator assembly is locked against rotation, the torque is multiplied by the torque converter.

The rotation of the stator assembly is conventionally accomplished using a one way clutch interposed between the stator blades and a fixed hub. One way clutches known in the related art typically include an inner race, an outer race with a plurality of roller bearings or sprags disposed therebetween. The bearings or sprags are usually retained between the inner and outer races by cages. The outer race spins or "freewheels" on the bearings in one direction relative to the inner race and is locked against rotation in the opposite direction. This locking or braking action is generally accomplished by configuring the inner diameter of the outer race such that it squeezes or constricts the bearings or sprags when movement is urged in the "locked up" direction.

As noted above, the stator assembly is non-rotatably held during the torque multiplication operating phase of the torque converter. This phase generally extends from stall to the approximate coupling point of the torque converter. The "coupling point" is a term used in the related art to describe the point where the torque ratio is near 1.0. At the coupling point, there is no torque multiplication as described above. When there is no torque multiplication, the torque converter becomes a fluid coupling and the stator "freewheels."

During torque multiplication, the fluid forces acting on the stator can be significant. These fluid forces can generate large, radially directed forces acting through the roller bearings or sprags outwardly through the outer race of the one way clutch. Under certain circumstances, these large forces can cause the outer race to crack or otherwise fail.

Thus, there is a need in the art for a stator assembly which smoothly operates during both freewheel and locked up conditions and which can sustain the large forces to which such stator assemblies are subjected during torque multiplication.

In addition, there is a constant effort in the related automotive art to lower costs by reducing weight, eliminating processing and manufacturing steps and otherwise streamlining the manufacturing process. While conventional stator assemblies and torque converter designs have worked well in the related art, there is an ongoing effort to simplify and thereby lower the costs of the manufacturing process for such stator assemblies and their torque converters. Thus, there is a continual need in the art for torque converters and their subcomponents which include less components and which result in cost and weight reduction over the conventional designs employed in the related art.

SUMMARY OF THE INVENTION

The present invention overcomes the disadvantages in the related art in a stator assembly having a single direction anti-rotation device. More specifically, the stator assembly includes a grounded member, a reaction member, and a blade assembly operatively coupled with the reaction member for rotational movement about an axis of rotation relative to the grounded member in one direction and fixed against rotational movement relative to the grounded member in the opposite direction. The reaction member is movable axially relative to the grounded member in response to fluid forces acting on the blade assembly between a first position wherein the reaction member and the blade assembly are free to rotate in one direction and a second, locked position wherein the reaction member and the blade assembly are fixed relative to the grounded member and against rotation in the opposite direction.

The stator assembly of the present invention eliminates the use of roller bearings or sprags, as well as the associated cages and inner and outer races which constrain the bearings or sprags. This results in a significant reduction in the number of components which make up the stator assembly of the present invention when compared with such devices in the related art. The reduction in the number of components of the stator assembly of the present invention also lowers the cost of manufacturing such stator assemblies as well as the torque converters in which they are employed. Furthermore, because the stator assembly of the present invention operates in a manner different from the stator assemblies of the related art, there are no radially directed forces which can cause failure of the clutch assemblies of the related art under certain circumstances. The projected useful life and durability of the stator assembly of the present invention is thereby increased over stator assemblies of the related art.

Other advantages of the invention will be readily appreciated as the same becomes better understood by reference to the following detailed description when considered in connection with the accompanying drawings.

DESCRIPTION OF THE PREFERRED EMBODIMENT(S)

Figure 1:
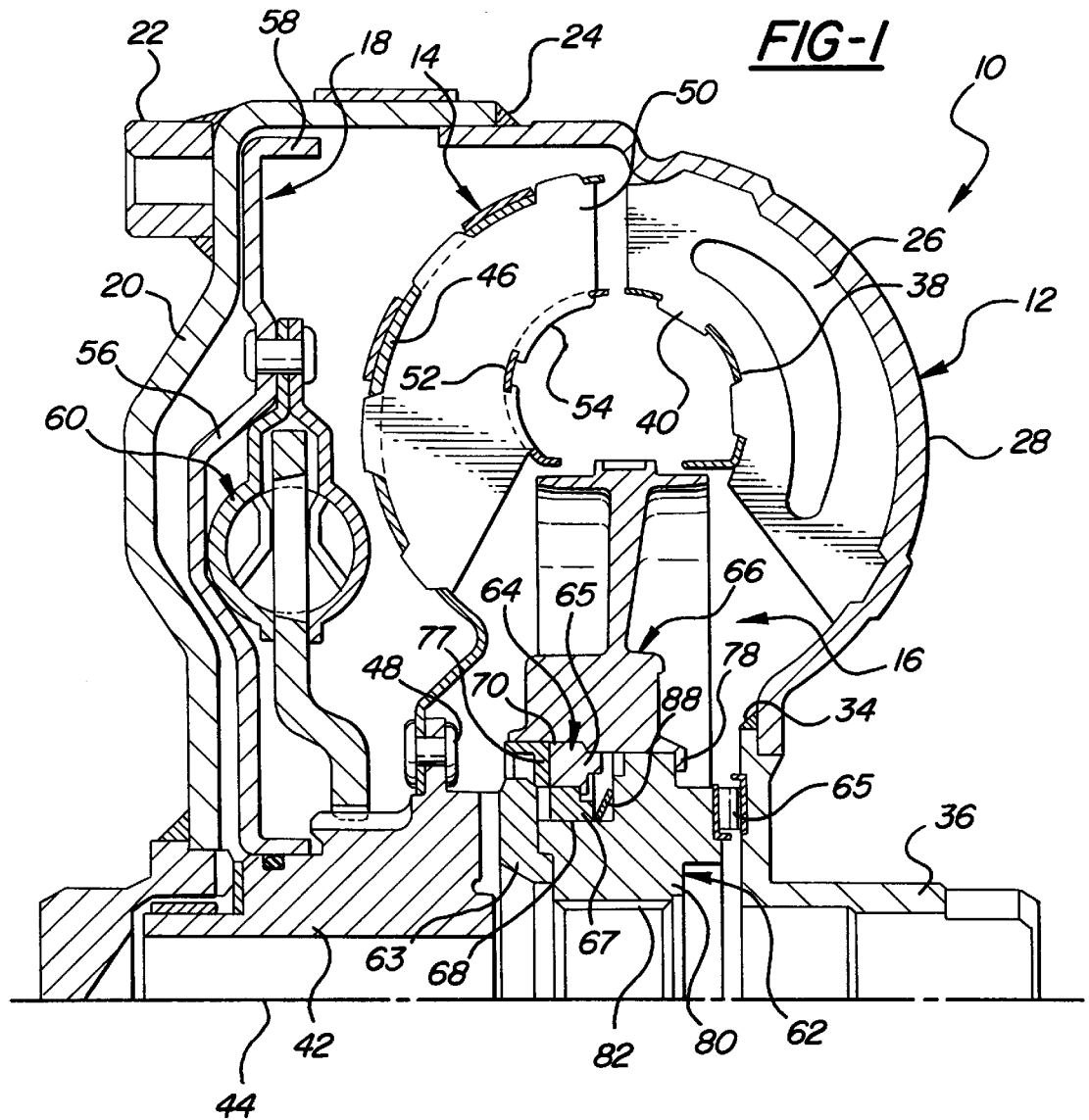
FIG. 1 is a cross-sectional side view of a torque converter employing the stator assembly of the present invention.
Figure 2:
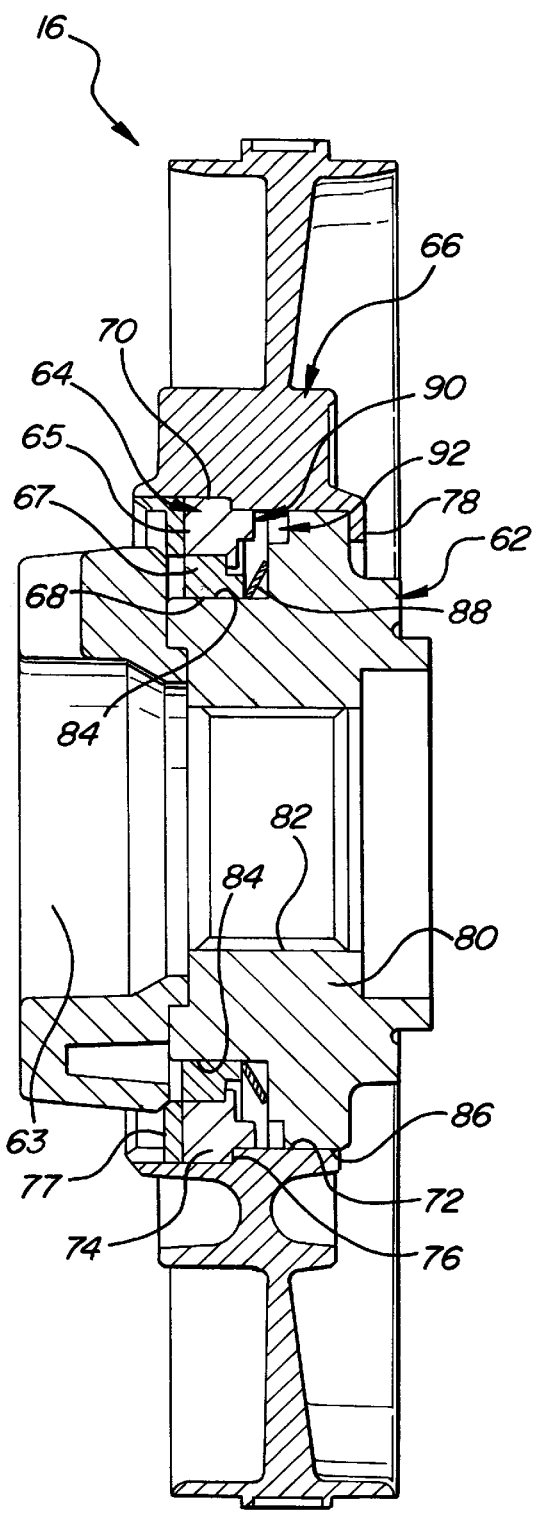
FIG. 2 is a cross-sectional side view of the stator assembly of the present invention in its freewheeling mode and employing a return spring.

Referring now to the drawings, where like numerals are used to describe like structure throughout the figures, a hydrodynamic torque converter for translating torque from a prime mover such as an internal combustion engine (not shown) to the input shaft of a transmission is generally shown at 10 in FIG. 1. The transmission may then subsequently distribute this power to one or more wheels (not shown) through other drive train components such as a drive shaft and an axle having a differential (also not shown). While the torque converter illustrated in FIG. 2 is particularly adapted for use with an automotive vehicle, those skilled in the art will understand that the torque converter may be employed in connection with other types of transmissions.

The torque converter 10 includes an impeller assembly, generally indicated at 12, a turbine assembly generally indicated at 14, a stator assembly, generally indicated at 16, and a lock-up clutch assembly, generally indicated at 18. Each of these assemblies will be described in greater detail below.

Power is transmitted from the rotating crank shaft (not shown) of the engine to a torque input member or front cover 20 of the torque converter. The front cover 20 may include a plurality of input drive lugs or threaded connectors 22. A rotatable plate member (not shown) is typically secured to the front cover member 20 by suitable fastening means such as bolts (not shown) which are received in the connectors 22 as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced contoured impeller blades 26 connected to the inside of an impeller shell 28. The impeller shell 28 is fixed, as for example by welding at 34, to an impeller hub or host transmission hydraulic pump drive hub 36. The impeller hub 36 may drive a pump (not shown) from which fluid is supplied to the hydrodynamic torque converter 10. The impeller blades 26 have an arcuate inner portion which is fixed to an impeller core 38 through the interaction of tabs 40 received in corresponding slots of the core 38.

The turbine assembly 14 is fluidly connected in driven relationship with the impeller assembly 12. The turbine assembly 14 includes an annular turbine hub 42 which is operatively connected to the input of the transmission and rotatable about an axis 44. A turbine shell 46 is mounted to the turbine hub 42 via rivets 48 or some other suitable fastener. A plurality of turbine blades 50 are carried by the turbine shell 46 as will be described in greater detail below. The turbine blades 50 include arcuate inner portions which are fixed to the turbine core 52 through the interaction of wings 54 received in corresponding slots in the turbine core 52.

The lock-up clutch assembly 18 is supported for rotation with the turbine assembly 14 and interposed between the turbine assembly 14 and the torque input member or front cover 20. The lock-up clutch assembly 18 includes an annular piston 56. An annular, disk shaped frictional element (not shown) is carried proximate to the outer peripheral flange 58 of the piston 56. The piston 56 is rotatably supported for axial movement on the turbine hub 42 into and out of engagement with the inner surface of the front cover 20 to provide direct torque transfer between the front cover 20 and the turbine assembly 14 as will be discussed in greater detail below.

The hydrodynamic torque converter 10 further includes a torsional damper, generally indicated at 60, which operatively interconnects the turbine assembly 14 and the lock-up clutch assembly 18. The torsional damper acts to dampen torsional vibrations due to impact loads and torsional pulsations generated by the internal combustion engine.

The stator assembly 16 is interposed between the impeller assembly 12 and the turbine assembly 14. The stator assembly 16 is rotationally isolated from the turbine assembly 12 via thrust washer 63 as well as rotationally isolated from the impeller assembly via roller bearing 65 disposed therebetween. The stator assembly 16 includes a grounded member, generally indicated at 62, a reaction member, generally indicated at 64 and a blade assembly generally indicated at 66. The blade assembly 66 is operatively coupled with the reaction member 64 for rotational movement about an axis of rotation 44 relative to the grounded member 62. The reaction member 64 and the blade assembly 66 are free to rotate in one direction and are fixed against rotational movement relative to the grounded member 62 in the opposite direction. More specifically, the reaction member 64 is movable axially relative to the grounded member 62 in response to fluid forces acting on the blade assembly 66 between a first position where the reaction member 64 and the blade assembly are free to rotate in one direction, as shown for example in FIGS. 1 and 2, and a second, locked position (shown in FIG. 3). In the locked position, the reaction member 64 and the blade assembly 66 are fixed relative to the grounded member 62 against rotation in the opposite direction as will be described in greater detail below.

Figure 3:
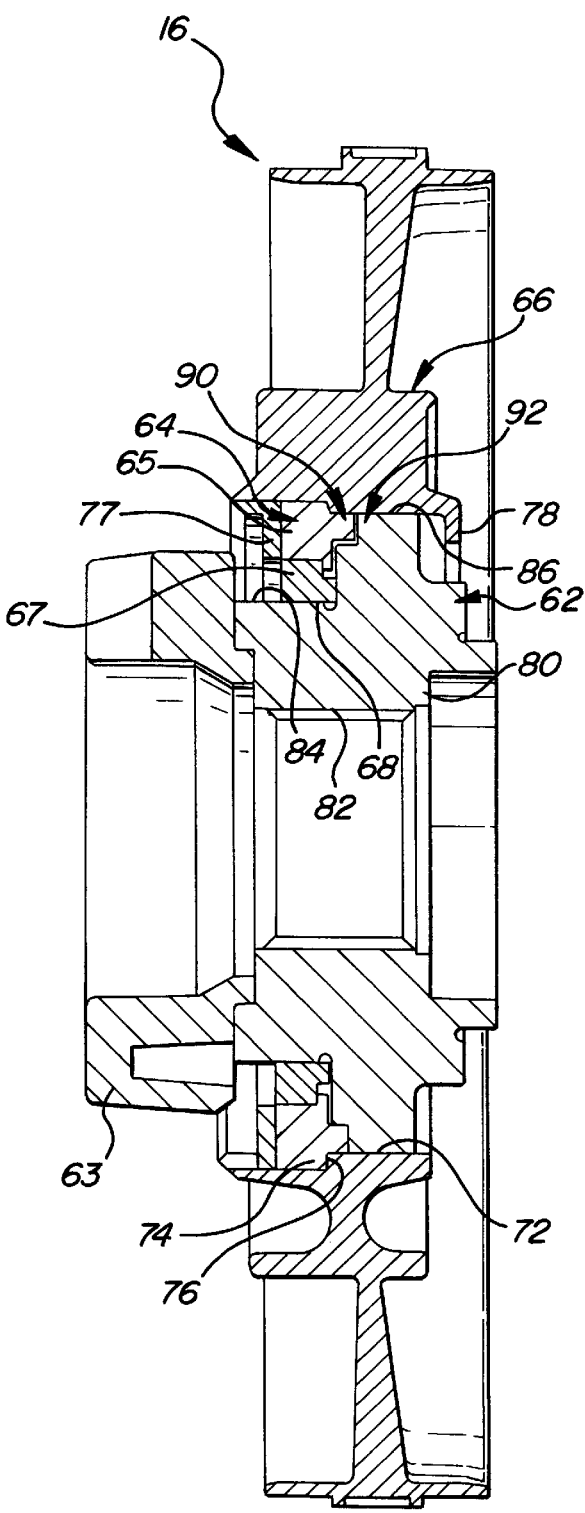
FIG. 3 is a cross-sectional side view of a stator assembly of the present invention shown in its locked up position and without a return spring.
Figure 4:
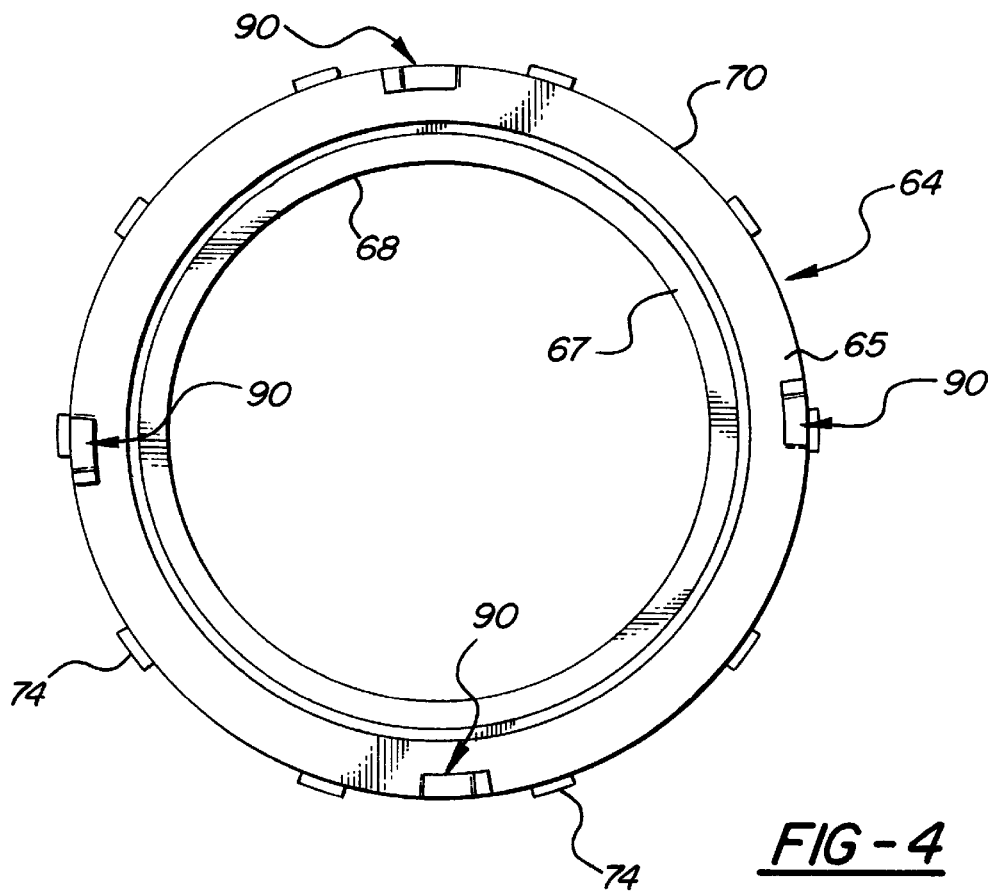
FIG. 4 is a front view of the reaction member of the stator assembly of the present invention.
Figure 5:
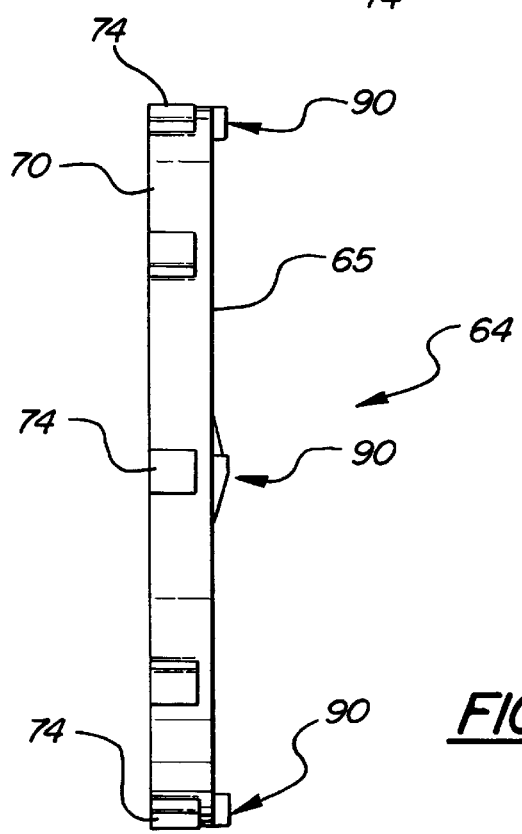
FIG. 5 is a side view of the reaction member shown in FIG. 4.

Referring now to FIGS. 2 and 3 in conjunction with FIGS. 4 and 5, the reaction member 64 has a ring-like shape and includes an inner diameter 68 rotatably supported for axial movement relative to the grounded member 62 and an outer diameter 70 which defines the circumference of the reaction member 64. The reaction member 64 includes an outer ring 65 having a circumference 70 and a bronze bushing 67 which defines the inner diameter 68 of the reaction member 64.

The blade assembly 66 defines an inner diameter 72 disposed about and fixed to the circumference 70 of the reaction member 64. The reaction member 64 includes a plurality of lugs 74 disposed spaced from one another annularly about the circumference 70 of the reaction member 64. On the other hand, the blade assembly 66 includes a plurality of slots 76 on the inner diameter 72 thereof which correspond to the plurality of lugs 74. The lugs 74 are received in the slots 76 for fixing the blade assembly 66 to the reaction member 64. A snap ring 77 retains the reaction member 64 fixed relative to the blade assembly 66. Those having ordinary skill in the art will appreciate that the blade assembly 66 may also be splined, swaged, or otherwise affixed to the reaction member 64 as is commonly known in the art. Additionally, it will be appreciated that the blade assembly may be formed integrally with the reaction member 64. The blade assembly 66 defines an annular stop lip 78 extending radially inwardly relative to the axis of rotation 44 which limits the axial movement of the reaction member 64 (and thus the blade assembly 66) relative to the grounded member 62 at the first position shown in FIGS. 1 and 2 and as will be described in greater detail below.

Figure 6:
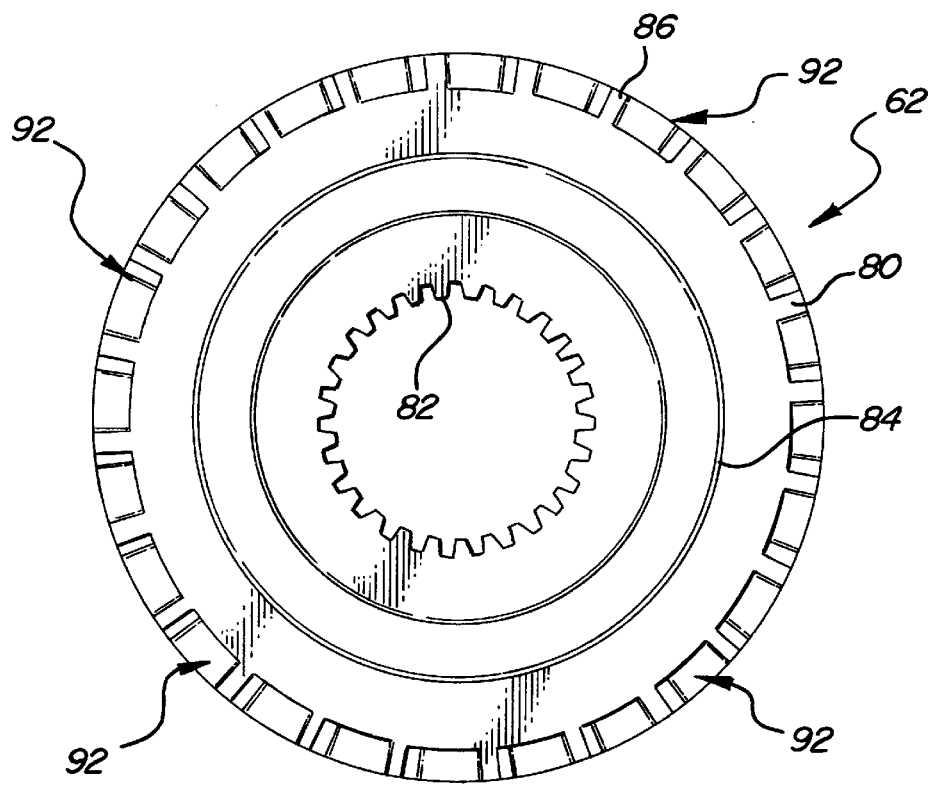
FIG. 6 is a front view of the grounded member of the stator assembly of the present invention.
Figure 7:
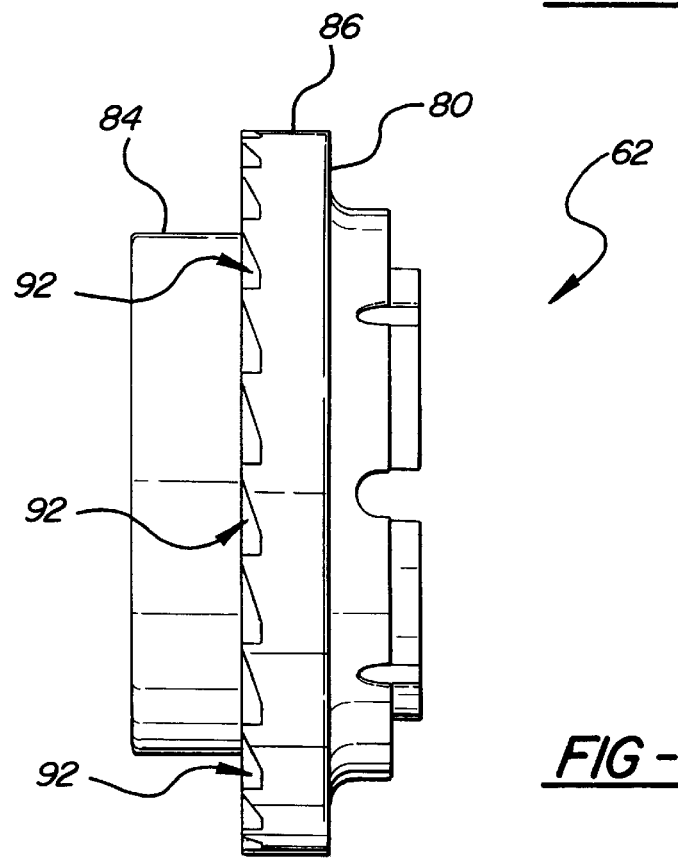
FIG. 7 is a side view of the grounded member shown in FIG. 6.

Referring now to FIGS. 2 and 3 in conjunction with FIGS. 6 and 7, the grounded member 62 includes an annular hub 80 having an inner diameter 82 which is fixed to a non-rotatable shaft (not shown). The hub 80 includes an annular bearing surface 84 for supporting the reaction member 64 for rotational and axial movement relative to the hub 80. The bronze bushing 67 is suupported for rotational and axial movement relative to the bearing surface 84 on the hub 80. The hub further includes an outer diameter 86 which defines the outer circumference of the hub 80.

As shown in FIGS. 1 and 2, a biasing member 88 may be employed between the grounded member 62 and the reaction member 64 for the purpose of urging the reaction member 64 to move axially relative to the grounded member 62 between the second, locked position and the first position. However, it is also possible to dispense with the biasing member 88 as shown in FIG. 3.

The reaction member 64 includes a plurality of teeth, generally indicated at 90. As illustrated in FIGS. 4 and 5, the reaction member 64 includes four teeth 90 which are annularly disposed about the axis of rotation 44 and spaced relative to one another on the reaction member 64. More specifically, the teeth 90 are annularly disposed about the outer ring 65 of the reaction member 64 and adjacent to the circumference 70 thereof.

Figure 8:
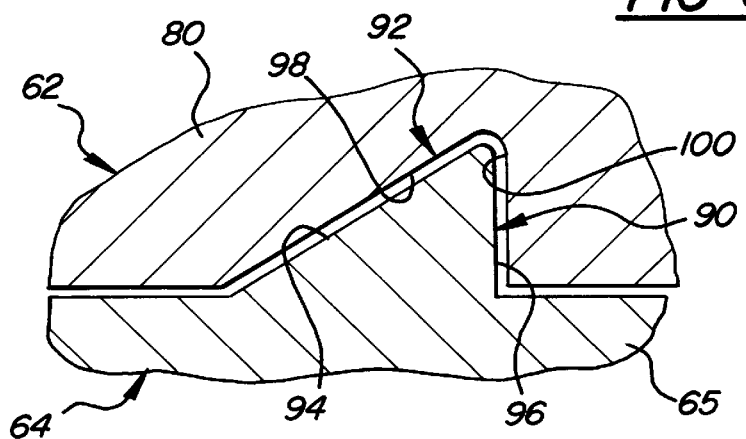
FIG. 8 is a partial cross-section illustrating the interaction between the reaction member teeth and the grounded member sockets.

The grounded member 62 includes a plurality of sockets 92 which are annularly disposed about the axis of rotation 44 and spaced relative to one another. More specifically and as illustrated in FIGS. 6 and 7, the sockets 92 are disposed annularly about the inner diameter 82 of the hub 80 and adjacent to the outer circumference 86 of the hub 80. When the reaction member 64 is in its second, locked position, as for example during a torque multiplication phase operation of the torque converter, the teeth 90 are received in the corresponding sockets 92 to fix the reaction member 64 and the blade assembly 66 relative to the grounded member 62. To that end and as best shown in FIG. 8, the teeth 90 include ramp portions 94 which define an acute angle relative to the reaction member 64 and a contact surface 96 disposed perpendicular to the reaction member 64.

The sockets 92 on the grounded member 62 include grounded ramp portions 98 corresponding to the ramp portions 94 on the teeth 90. Furthermore, the sockets 92 also include an abutment surface 100 which corresponds to the contact surface 96 on the teeth 90. The contact surface 96 on the reaction member teeth 90 are adapted to engage the abutment surface 100 on the grounded member sockets 92 to hold the reaction member 64 against rotation relative to the grounded member 62 when the reaction member 64 is moved to its second, locked position under the influence of fluid forces acting on the blade assembly 66. On the other hand, the ramp portions 94 on the reaction member teeth 90 and the grounded ramp portions 98 on the grounded member sockets 92 cooperate to disengage the reaction member 64 from the grounded member 62 when the reaction member 64 moves axially from the second, locked position to the first position (shown in FIGS. 1 and 2) under the influence of fluid forces acting on the blade assembly 66.

The stator assembly 16 of the present invention eliminates use of roller bearings or sprags as well as the associated cages and inner and outer races which constrain the bearings or sprags. This results in a significant reduction in the number of components which make up the stator assembly of the present invention when compared with such devices in the related art. The reduction in the number of components in the stator assembly 16 of the present invention also lowers the cost of manufacturing such stator assemblies as well as the torque converters in which they are employed.

Operation of the Torque Converter

Rotation of the crank shaft of the engine causes the front cover 20 to rotate with it through the actuation of the plate member (not shown). The front cover is welded at 24 to the impeller shell 28. Therefore, the impeller assembly 12 rotates with the crankshaft. The fluid within the impeller assembly 12 is set into motion by the rotation of the impeller assembly 12 which is kept filled by the fluid pressure from a host transmission hydraulic pump (not shown). The impeller blades 26 transfers mechanical energy into hydrokinetic energy. As the fluid is put into motion by the impeller blades 26, it is thrown outward by centrifugal forces and deflected into the turbine assembly 14 at an angle. The fluid strikes the turbine blades 50 of the turbine assembly 14, thus imparting torque or turning effort to the turbine assembly 14 and causing the turbine shell 46 to rotate about its axis 44. The turbine shell 46 is connected by rivets 48 to the turbine hub 42. The turbine hub 42 is, in turn, operatively connected to the input of the transmission.

During normal operation of the hydrodynamic torque converter 10 at low speed ratios, piston 56 of the lock-up clutch assembly 18 is not applied. Thus, torque is imparted to the input of the transmission via the turbine assembly 14. During this operational phase, the torque input to the torque converter is multiplied. Forces act on the pressure side of the blade assembly 66 producing an axially directed force thereon. This force moves the blade assembly 66 and the reaction member 64 axially relative to the grounded member 62. More specifically, the bronze bushing 67 slides to the right on the bearing surface 84 on the hub 80 when viewed in FIGS. 1 through 3. Similarly, the inner diameter 72 of the blade assembly 66 slides to the right relative to the outer diameter 86 of the hub 80. The contact surfaces 96 on the reaction member teeth 90 engage the abutment surface 100 on the grounded member 92 to hold the reaction member 64 and thus the blade assembly 66 coupled therewith against rotation relative to the grounded member 62. The blade assembly 66 is thus locked against rotation. This results in the desired torque multiplication at lower speed ratios.

As noted earlier, the stator assembly 16 can be subjected to significant forces during the torque multiplication phase of operation of the torque converter. These operating conditions have lead to stator failure due to large radially directed forces acting outwardly on the outer race of the one way clutches employed in the related art. However, the structure of the stator assembly 16 of the present invention is configured to eliminate such radially directed forces. More specifically, the stator assembly 16 of the present invention is better adapted to deal with the loads placed thereon because of the surface to surface contact between the contact surface 96 on the reaction member teeth 90 and the abutment surface 100 on the grounded member sockets 92. The contact 96 and abutment 100 surfaces provide significant surface area contact which can be tailored to handle loads generated in a variety of applications. While there are four teeth 90 disposed annularly adjacent the outer circumference 70 on the reaction member 64, those of ordinary skill in the art will appreciate that more or less teeth may be employed as the case may be.

At higher speed ratios, the torque converter begins to operate as a fluid coupling and the torque is no longer multiplied. When this occurs, the annular piston 56 of the lock-up clutch is applied. Fluid pushes the piston 56 against the front cover with a friction disk sandwiched between these two elements. The flow of power or engine torque is then transmitted through the front cover 20 and the lock-up clutch piston 56 directly to the turbine hub 42 and the input to the transmission. Therefore, the front cover 20, lock-up clutch assembly 18, turbine assembly 14 and the input to the transmission rotate together.

At the same time, fluid forces begin to act on the surface of the blade assembly 66 opposite to the pressure side thereof. This creates an axially directed force to the left as viewed in FIGS. 1 through 3. When this occurs, the ramp portions 94 on the reaction member teeth 90 and the grounded ramp portions 98 on the grounded member sockets 92 cooperate to disengage the reaction member 64 from the grounded member 62. The reaction member 64 then moves axially from the second, locked position to the first position under the influence of the fluid forces acting on the blade assembly 66. A biasing member 88 may also be employed to urge the reaction member to the left. However, it is also possible to dispense with the biasing member 88 as shown in FIG. 3. In any event, the reaction member 64 and blade assembly are then able to spin or "freewheel" relative to the grounded member 62.

In this way, the stator assembly 16 of the present invention overcomes the disadvantages in the related art by eliminating the radially directed forces which can cause failure of the clutch assemblies commonly employed today. The projected useful life and durability of the stator assembly 16 of the present invention is thereby increased over those known in the related art. Further, and as noted above, the cost and complexity of the stator assembly 16 of the present invention compares favorably with one way clutch assemblies typically employed in torque converters in the related art.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What we claim is:

1. A stator assembly for use in a torque converter, said stator assembly comprising:

a grounded member, a reaction member and a blade assembly operatively coupled with said reaction member for rotational movement about an axis of rotation relative to said grounded member in one direction and fixed against rotational movement relative to said grounded member in the opposite direction;

said reaction member having a ring-like shape and including an inner diameter rotatably supported for axial movement relative to said grounded member and an outer diameter defining a circumference of said reaction member, said reaction member further including a plurality of lugs disposed spaced from one another and annularly about said circumference of said reaction member;

said blade assembly defining an inner diameter disposed about and fixed to said circumference of said reaction member, said blade assembly including a plurality of slots in said inner diameter thereof corresponding to said plurality of lugs, said lugs received in said slots for fixing said blade assembly relative to said reaction member; and said reaction member movable axially relative to said grounded member in response to fluid forces acting on said blade assembly between a first position wherein said reaction member and blade assembly are free to rotate in one direction and a second, locked position wherein said reaction member and said blade assembly are fixed relative to said grounded member and against rotation in said opposite direction.

2. A stator assembly as set forth in claim 1 wherein said reaction member includes a plurality of teeth annularly disposed about said axis of rotation and spaced relative to one another, said grounded member including a plurality of sockets annularly disposed about said axis of rotation and spaced relative to one another, said teeth received in said corresponding sockets to fix said reaction member and said blade assembly relative to said grounded member when said reaction member is in said second, locked position.

3. A stator assembly as set forth in claim 2 wherein said teeth include a ramp portion defining an acute angle relative to said reaction member and a contact surface disposed perpendicular to said reaction member.

4. A stator assembly as set forth in claim 3 wherein said sockets on said grounded member include a grounded ramp portion corresponding to said ramp portion on said teeth and an abutment surface corresponding to said contact surface on said teeth, said contact surface on said reaction member teeth adapted to engage said abutment surface on said grounded member sockets to hold said reaction member against rotation relative to said grounded member when said reaction member is moved to said second, locked position under the influence of fluid forces acting on said blade assembly, said ramp portion on said reaction member teeth and said grounded ramp portion on said grounded member sockets cooperating to disengage said reaction member from said grounded member when said reaction member moves axially from said second, locked position to said first position under the influence of fluid forces acting on said blade assembly.

5. A stator assembly as set forth in claim 2 wherein said grounded member includes a hub having an inner diameter which is fixed to a non-rotatable shaft, a bearing surface for supporting said reaction member for rotational and axial movement relative to said hub and an outer diameter defining an outer circumference of said hub, said teeth disposed annularly about said inner diameter of said reaction member and adjacent to the said circumference of said reaction member, said socket disposed annularly about said inner diameter of said hub and adjacent to said outer circumference of said hub.

6. A stator assembly as set forth in claim 1 including a biasing member which urges said reaction member to move axially relative to said grounded member between said second, locked position and said first position.

7. A stator assembly for use in a torque converter, said stator assembly comprising:

a grounded member, a reaction member and a blade assembly operatively coupled with said reaction member for rotational movement about an axis of rotation relative to said grounded member in one direction and fixed against rotational movement relative to said grounded member in the opposite direction;

said reaction member movable axially relative to said grounded member in response to fluid forces acting on said blade assembly between a first position wherein said reaction member and blade assembly are free to rotate in one direction and a second, locked position wherein said reaction member and said blade assembly are fixed relative to said grounded member and against rotation in said opposite direction;

said blade assembly defining an annular stop lip extending radially inwardly relative to said axis of rotation which limits the axial movement of said reaction member relative to said grounded member at said first position.

8. A torque converter for translating kinetic energy between a prime mover and a transmission, said torque converter comprising:

a torque input member and an impeller assembly operatively coupled for rotation with said torque input member, a turbine assembly fluidly connected in driven relationship with said impeller assembly and a stator assembly interposed between said turbine assembly and said impeller assembly;

said stator assembly including a grounded member, a reaction member and a blade assembly operatively coupled with said reaction member for rotational movement about an axis of rotation relative to said grounded member in one direction and fixed against rotational movement relative to said grounded member in the opposite direction;

said reaction member having a ring-like shape and including an inner diameter rotatably supported for axial movement relative to said grounded member and an outer diameter defining a circumference of said reaction member, said reaction member further including a plurality of lugs disposed spaced from one another and annularly about said circumference of said reaction member;

said blade assembly defining an inner diameter disposed about and fixed to said circumference of said reaction member, said blade assembly including a plurality of slots in said inner diameter thereof corresponding to said plurality of lugs, said lugs received in said slots for fixing said blade assembly relative to said reaction member; and said reaction member movable axially relative to said grounded member in response to fluid forces acting on said blade assembly between a first position wherein said reaction member and blade assembly are free to rotate in one direction and a second, locked position wherein said reaction member and said blade assembly are fixed relative to said grounded member and against rotation in said opposite direction.

9. A torque converter as set forth in claim 8 wherein said reaction member includes a plurality of teeth annularly disposed about said axis of rotation and spaced relative to one another, said grounded member including a plurality of sockets annularly disposed about said axis of rotation and spaced relative to one another, said teeth received in said corresponding sockets to fix said reaction member and said blade assembly relative to said grounded member when said reaction member is in said second, locked position.

10. A torque converter as set forth in claim 9 wherein said teeth include a ramp portion defining an acute angle relative to said reaction member and a contact surface disposed perpendicular to said reaction member.

11. A torque converter as set forth in claim 10 wherein said sockets on said grounded member include a grounded ramp portion corresponding to said ramp portion on said teeth and an abutment surface corresponding to said contact surface on said teeth, said contact surface on said reaction member teeth adapted to engage said abutment surface on said grounded member sockets to hold said reaction member against rotation relative to said grounded member when said reaction member is moved to said second, locked position under the influence of fluid forces acting on said blade assembly, said ramp portion on said reaction member teeth and said grounded ramp portion on said grounded member sockets cooperating to disengage said reaction member from said grounded member when said reaction member moves axially from said second, locked position to said first position under the influence of fluid forces acting on said blade assembly.

12. A torque converter as set forth in claim 9 wherein said grounded member includes a hub having an inner diameter which is fixed to a non-rotatable shaft, a bearing surface for supporting said reaction member for rotational an axial movement relative to said hub and an outer diameter defining an outer circumference of said hub, said teeth disposed annularly about said inner diameter of said reaction member and adjacent to the said circumference of said reaction member, said socket disposed annularly about said inner diameter of said hub and adjacent to said outer circumference of said hub.

13. A torque converter as set forth in claim 8 including a biasing member disposed between said grounded member and said reaction member which urges said reaction member to move axially relative to said grounded member between said second, locked position and said first position.

14. A torque converter for translating kinetic energy between a prime mover and a transmission, said torque converter comprising:

a torque input member and an impeller assembly operatively coupled for rotation with said torque input member, a turbine assembly fluidly connected in driven relationship with said impeller assembly and a stator assembly interposed between said turbine assembly and said impeller assembly;

said stator assembly including a grounded member, a reaction member and a blade assembly operatively coupled with said reaction member for rotational movement about an axis of rotation relative to said grounded member in one direction and fixed against rotational movement relative to said grounded member in the opposite direction;

said reaction member movable axially relative to said grounded member in response to fluid forces acting on said blade assembly between a first position wherein said reaction member and blade assembly are free to rotate in one direction and a second, locked position wherein said reaction member and said blade assembly are fixed relative to said grounded member and against rotation in said opposite direction;

said blade assembly defining an annular stop lip extending radially inwardly relative to said axis of rotation which limits the axial movement of said reaction member relative to said hub at said first position.

* * * * *